Figures 1, 2:
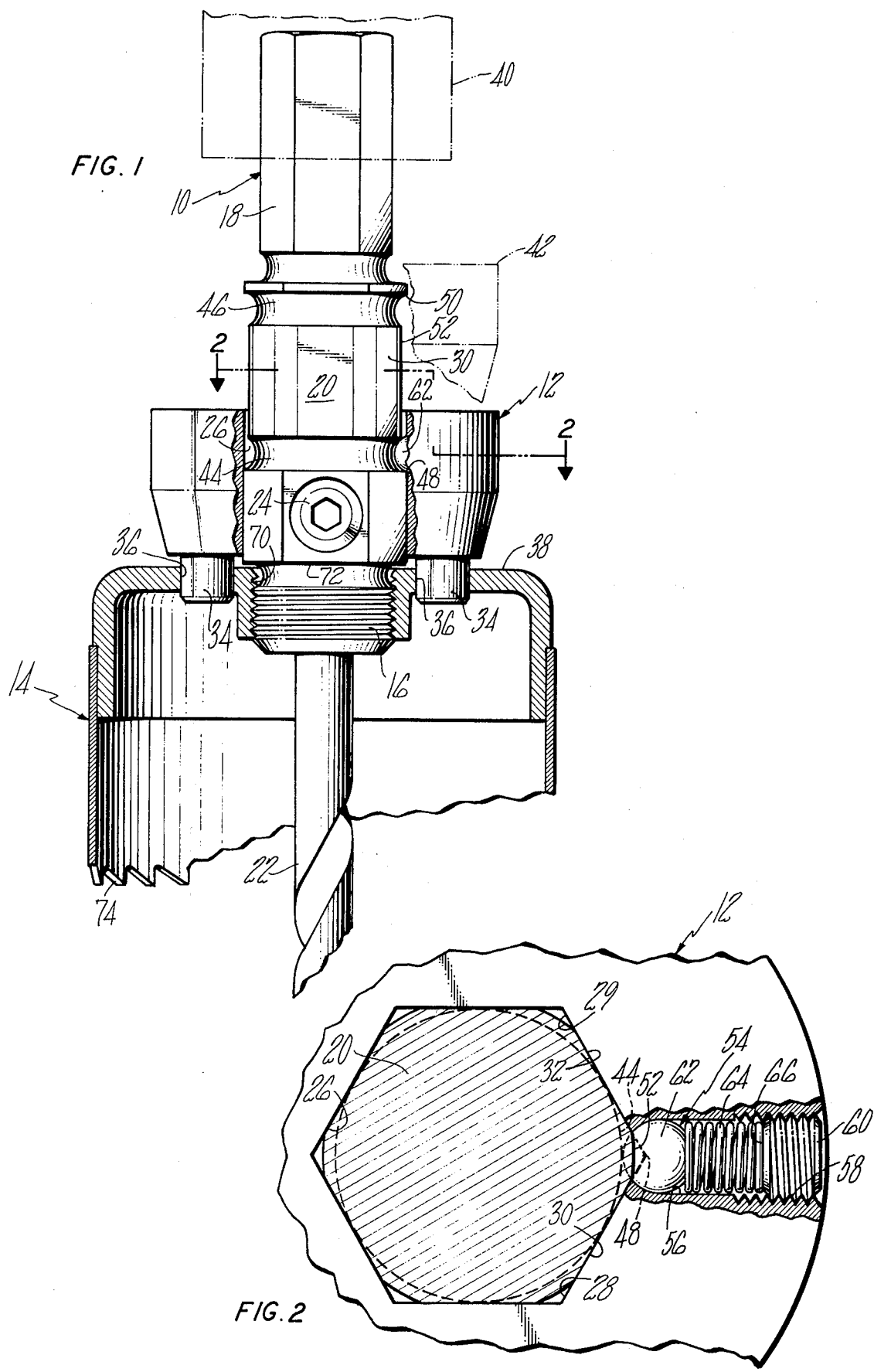

United States Patent [19]

Clark et al.

[11] 4,036,560

[45] July 19, 1977

[54] HEAVY DUTY HOLE SAW AND ARBOR ASSEMBLY

[75] Inventors: Calvin M. Clark, Bernardston, Mass.; Americo P. D'Attilio, East Hartford, Conn.

[73] Assignee: Stanadyne, Inc., Hartford, Conn.

[21] Appl. No.: 628,105

[22] Filed: Nov. 3, 1975

[51] Int. Cl.² .................. B23B 41/02; B27M 3/00
[52] U.S. Cl. ................................ 408/204; 144/23
[58] Field of Search ............... 408/191, 196, 204, 209, 408/231, 232, 233, 239, 703; 279/1 B; 90/11 A; 151/24, 44; 64/4, 6; 403/104, 106, 326, 328; 144/20, 23, 24; 145/121

[56] References Cited

U.S. PATENT DOCUMENTS

| 2,349,400 | 5/1944 | Beckwith | 144/23 X |
| 2,438,558 | 3/1948 | Hollander | 90/11 A X |
| 2,985,899 | 5/1961 | Elliot | 408/239 X |
| 3,267,975 | 8/1966 | Enders | 144/23 X |
| 3,784,316 | 1/1974 | Bittern | 408/204 |

Primary Examiner—Harrison L. Hinson
Attorney, Agent, or Firm—Prutzman, Hayes, Kalb & Chilton

[57] ABSTRACT

A drive collar is non-rotatably mounted for sliding movement on an arbor between working and release positions. In working position, the drive collar is disposed adjacent the base of a hole saw which is threadably mounted on an end of the arbor, and the collar and the hole saw are coupled for positively transmitting drive torque from the arbor to the saw. In release position, the drive collar is retracted from the saw and rendered inoperative for quick and easy assembly and disassembly of the saw and arbor.

4 Claims, 2 Drawing Figures

U.S. Patent    July 19, 1977    4,036,560

HEAVY DUTY HOLE SAW AND ARBOR ASSEMBLY

This invention relates to hole saws and particularly concerns a quick disconnect arbor of type shown in U.S. Pats. No. 3,784,316 entitled "Hole Saw and Reversible Quick Disconnect Drive Therefor" issued Jan. 8, 1974 and U.S. Pat. No. 3,837,759 entitled "Hole Saw and Quick Disconnect Drive Therefor" issued Sept. 24, 1974, both patents being assigned to the assignee of this invention.

A principal object of this invention is to provide a new and improved hole saw and arbor assembly featuring quick disconnect of the saw from the arbor without requiring removal of the arbor from its power unit.

Another object of this invention is to provide such an assembly having a minimum number of parts each of which use a minimum amount of material for simplified manufacture at significant cost savings.

A further object of this invention is to provide an assembly of the type described particularly designed for heavy duty application in a compact, rugged contruction providing reliable service under demanding operating conditions for an extended period of time.

Other objects will be in part obvious and in part pointed out more in detail hereinafter.

A better understanding of this invention will be obtained from the following detailed description and the accompanying drawing illustrative application of this invention.

In the drawing:

FIG. 1 is an elevational view, partly broken away and partly in section, showing an assembly incorporating this invention; and FIG. 2 is an enlarged cross-sectional view, partly broken away, taken generally along line 2—2 of FIG. 1.

Referring now to the drawing in detail, hole saws of a type contemplated in this invention are generally driven by a portable power unit, e.g., a conventional electric drill equipped with a so-called "Jacobs" three jaw chuck. The assembly in FIG. 1 shows an arbor 10, a drive collar 12 and a hole saw 14 which is threadably mounted on a threaded terminal section 16 of the arbor 10.

To achieve significant cost-savings in the manufacture of this assembly, the body of arbor 10 may be formed from readily available commercial stock of hexagonal cross section wherein the width across flats on a chuck engaging section 18 of the arbor 10 is less than the width across flats on its intermediate drive section 20, the threaded terminal section 16 of the arbor being shown in the drawing as being formed in continuation with an end of section 20. This intermediate section 20 of the arbor 10 will be hereinafter called the drive shaft for convenience of description and ease of understanding. Drive shaft 20 may be formed originally from ⅝ inch hex stock, e.g., with the chuck engaging section 18 being ½ inch hex stock.

The arbor 10 may conveniently be provided with a bore, not shown, axially formed in its threaded terminal section 16 for receiving a suitable pilot drill 22 conventionally secured within the bore by a set screw 24 positioned in the body of arbor 10.

To further minimize the number of different component parts the quick disconnect drive collar 12 is designed as a single unit with a central hexagonal aperture 26 for receiving the drive shaft 20. The central aperture 26 of the drive collar 12 accordingly defines walls such as at 28, 29 as best seen in FIG. 2, which are engageable with the flats 30, 32 of the drive shaft 20, whereby collar 12 is quickly and easily mounted on the drive shaft 20 for non-rotatable axial sliding movement.

For coupling the drive collar 12 and saw 14 for simultaneous rotation in unison with the arbor 10, a pair of depending drive pins 34, 34 are fixed to the drive collar 12, preferably with a press fit in diametrically opposed relation on the collar 12, so as to project into a pair of mating holes 36, 36 formed in a base 38 of the hole saw 14 upon its being mounted on the threaded section 16 of arbor 10. The pins 34, 34 are shown projecting beyond the bottom face of the drive collar 12 a sufficient distance so that the ends of the pins 34, 34 pass completely through the base 38 of the hole saw 14 in positive torque transmitting relation thereto when the drive collar 12 and hole saw 14 are assembled for operation as shown in full lines in FIG. 1.

To provide quick and easy assembly and disassembly of the hole saw 14 and arbor 10 without removing the arbor 10 from a chuck (such as that shown in phantom at 40) of a power unit, not shown, the assembly is specifically designed for fast action, manual manipulation of the drive collar 12 between a working position shown in full lines in FIG. 1 and a release position partly shown in phantom at 42. In its working position, the drive collar 12 adjoins the saw 14 with pins 34, 34 coupling the drive collar 12 to the saw 14 in positive torque transmitting relation. The drive collar 12 in its release position at 42 is remotely spaced in retracted relation to the saw 14 with the drive between the drive collar 12 and the saw 14 being rendered inoperative to permit facile removal and reassembly of the saw 14 and the threaded section 16 of arbor 10.

In the specifically illustrated embodiment, the drive shaft 20 of arbor 10 has a pair of spaced grooves 44 and 46 circumferentially extending about the drive shaft 20 with first and second radial shoulders 48 and 50 being defined by the grooves 44 and 46 adjacent opposite ends of the drive shaft 20. The arbor body is turned or machined to remove tips of the longitudinally extending hex corners on the drive shaft 20 between grooves 44 and 46 to reduce the maximum diameter across corners of the drive shaft 20. This technique has been found to be satisfactory to rapidly contour longitudinally extending edges such as at 52 between adjacent flats 30, 32 of the drive shaft 20 (FIG. 2) to smoothly merge with the adjacent flats 30, 32 and to provide a detent track extending longitudinally along the drive shaft 20 and terminating at its opposite ends at the grooves 44 and 46.

To establish and releasably maintain the drive collar 12 in selected working and release positions, a detent device 54 is provided and the drive collar 12 has a detent receiving radial chamber 56 in communication with the central aperture 26 at one of its corners to register with longitudinal edge 52, e.g., between adjacent flats 30 and 32 on drive shaft 20 for receiving the detent device which cooperates with the grooves 44 and 46 to establish the working and release positions of the drive collar 12 on the drive shaft 20.

More specifically, the chamber 56 is shown having an outer threaded end opening 58 within which a set screw 60 is threadably mounted, and a ball detent 62 is received in the chamber 56 at its opposite inner end. The ball detent 62 is urged by spring 64 toward the drive shaft 20 into contact engagement with confronting edge 52 which serves as the track upon which ball detent 62 rides. The spring 64 is shown as a conventional compression spring having its opposite ends seated against the ball detent 62 and an inner terminal end of the set screw 60 which serves as an adjustable spring seat 66.

By virtue of the above described construction, the radial shoulders 48 and 50 formed by the full size hex corners adjacent grooves 44 and 46 are of enlarged radius relative to the track longitudinally extending along the reduce hex corner or edge 52 of adjacent flats 30 and 32 of the drive shaft 20 and the adjustability of the detent set screw 60 mounted in the drive collar 12 enables the inner end of the set screw 60 to be located so as to prevent movement of the ball detent 62 beyond grooves 44 and 46 in response to manipulation of the drive collar 12. I. e., the spring seat 66 is adjusted to ensure that the spring 64 will be compressed into a solid cylinder as the ball detent 62 is driven toward the shoulders 48 and 50 beyond the plane containing the track 52. Thus the spring seat 66 established by the screw 60 cooperates with the spring 64 and radial shoulders 48 and 50 to jointly serve as a stop for the ball detent at the grooves 44 and 46 to prevent axial sliding movement of the drive collar 12 on the drive shaft 20 beyond its working and release positions.

In operation, the set screw 60 on the drive collar 12 may be backed out sufficiently to permit the collar 12 to be mounted on the arbor drive shaft 20. The set screw 60 is then adjusted to ensure that the ball detent 62 will not ride over the shoulders 48 and 50 adjacent the opposite ends of the drive shaft 20. The hole saw 14 is easily assembled on the arbor 10 by initially moving drive collar 12 into release position at 42 and rotating internally threaded hub 70 on the base 38 of the hole saw 14 onto the threaded section 16 until the base 38 of the hole saw 14 bottoms on shoulders 72 at the end of the drive shaft 20. The hole saw 14 is then backed off a few degrees, to ensure that the base 38 of the hole saw 14 is not bottomed against the drive shaft 20, and the holes 36, 36 in the base 38 and the pins 34, 34 of the drive collar 12 are brought into alignment. The drive collar 12 is then axially shifted from release position at 42 into full line working position on the arbor 10 with the drive pins 34, 34 extending through holes 36, 36 in the base 38 of the saw 14, thereby establishing a positive torque transmitting drive from the arbor 10 to hole saw teeth 74. It will be understood that the drive which couples the drive collar 12 to the base 38 of the hole saw 14 is such that when assembled, any possibility of the saw 14 riding onto the shoulder 72 of the arbor drive shaft 20 is precluded, and the stress imposed on the threaded mounting connection of the hub 70 of the saw 14 and the threaded section 16 of the arbor 10 is minimized. To remove the hole saw 14 from the arbor 10, it is only necessary to slide the drive collar 12 upwardly to drive the ball detent 62 out of groove 44 and along the edge 52, serving as the track on the drive shaft 20 into groove 46 to establish the release position of the drive collar 12 relative to the drive shaft 20. In release position, the drive pins 34, 34 are completely withdrawn from the base 38 of the saw 14 which then may be quickly unscrewed and released from arbor 10.

Thus, the assembly of this invention provides a simple and rapid way of connecting and disconnecting the saw from the arbor in a construction utilizing a minimum number of parts for simplicity and economy of manufacture and heavy duty use to effect significant cost savings in a quality tool of rugged and compact structure. The simplified hex connection between arbor 10 and the drive shaft 20 serves to positively transmit torque through pins 34, 34 to saw 14, while permitting exceptionally rapid engagement and disengagement of the drive coupling. Moveover, the disclosed detent device 54 releasably maintains the drive collar 12 in place during use as well as during saw blade changeover, as desired.

As will be apparent to persons skilled in the art, various modifications, adaptations and variations of the foregoing specific disclosure can be made without departing from the teachings of the present invention.

We claim:

1. For engagement with a power operated chuck, a hole saw and arbor assembly comprising a rotatable chuck engaging arbor including a drive shaft and a threaded section at an end of the drive shaft, a drive collar mounted on the drive shaft for non-rotating axial sliding movement on the drive shaft between a working position and a release position, a hole saw mounted on the threaded section of the arbor for rapid assembly and disassembly of the saw and arbor, a quick-disconnect drive pin fixed to the drive collar, and an opening in the hole saw for receiving the pin when the drive collar is in working position on the drive shaft to transmit torque between the drive collar and saw during rotation of the arbor, the drive collar in said working position being in confronting face to face relation to the saw, the drive collar in release position being in retracted relation to the saw and remotely spaced from the saw a distance sufficient to withdraw the drive pin from the saw opening without disengaging the arbor and chuck while permitting quick and easy assembly and disassembly of the saw and the threaded section of the arbor.

2. A hole saw and arbor assembly comprising a rotatable arbor including a drive shaft and a threaded section at an end of the drive shaft, a hole saw mounted on the threaded section of the arbor for rapid assembly and disassembly of the saw and arbor, first and second radial shoulders adjacent opposite ends of the drive shaft respectively, the drive shaft having a hexagonal cross section with a maximum radius to its corners less than the radius of said first and second radial shoulders, a drive collar mounted on the drive shaft and having a complementary hexagonal aperture for receiving the drive shaft, the drive collar having a radial chamber opening into its aperture and registering with a longitudinally extending corner edge between adjacent flats of the hexagonal drive shaft, said edge defining a detent track aligned with an intermediate said first and second radial shoulders, a ball detent and spring being received in the chamber of the drive collar, an adjustable seat mounted on the drive collar and engaging the spring for urging the ball detent toward the drive shaft, the seat cooperating with the spring and radial shoulders to jointly serve as stops for the ball detent, such that movement of the drive collar is limited to axial shifting between said radial shoulders which cooperate with the ball detent to establish and releasably maintain the drive collar in selected working and release positions, and a quick-disconnect drive for coupling the drive collar and saw for simultaneous rotation in unison with the arbor, the drive collar being disposed adjacent the saw in working position with the drive coupling the drive collar and saw in positive torque transmitting relation, the drive collar in release position being remotely spaced in retracted relation to the saw with the drive rendered inoperative, permitting quick and easy assembly and disassembly of the saw and the threaded section of the arbor.

3. The assembly of claim 2, further including at least one groove circumferentially extending about the drive shaft and defining one of said first and second radial shoulders adjacent an end of the drive shaft.

4. A hole saw and arbor assembly comprising a rotatable arbor including a drive shaft and a threaded section at an end of the drive shaft, a drive collar mounted on the drive shaft for non-rotating axial sliding movement on the drive shaft between a working position and a release position, the cross section of the drive shaft having a non-circular periphery defining longitudinally extending drive surfaces, the drive collar having a non-circular shaft receiving aperture therethrough defining walls engageable with the drive surfaces of the drive shaft to prevent relative rotation therebetween and limiting drive collar movement to axial sliding movement on the drive shaft for establishing said working and release positions, a hole saw mounted on the threaded section of the arbor for rapid assembly and disassembly of the saw and arbor, and a quick-disconnect drive for selectively coupling the drive collar and saw for simultaneous rotation in unison with the arbor, the drive collar being disposed in confronting adjacent relation to the saw in said working position with the drive coupling the drive collar and saw in positive torque transmitting relation, the drive collar in release position being in retracted relation to the saw and remotely spaced from the saw a distance sufficient to render the drive inoperative, permitting quick and easy assembly and disassembly of the saw and the threaded section of the arbor.

* * * * *

UNITED STATES PATENT OFFICE
CERTIFICATE OF CORRECTION

PATENT NO. : 4,036,560
DATED : July 19, 1977
INVENTOR(S) : Calvin M. Clark and Americo P. D'Attilio It is certified that error appears in the above—identified patent and that said Letters Patent are hereby corrected as shown below:

Column 1, line 10,
line 46, "cost-savings" should be --cost savings--.

Column 3, line 9, "reduce" should be --reduced--;
line 19, before "screw" insert --set--.

Column 4, line 50, "an" should be --and--;
line 62, "unision" should be --unison--.

Signed and Sealed this

Seventh Day of March 1978

[SEAL]

Attest:

RUTH C. MASON
Attesting Officer

LUTRELLE F. PARKER
Acting Commissioner of Patents and Trademarks